(12) United States Patent
Check et al.

(10) Patent No.: US 8,433,950 B2
(45) Date of Patent: Apr. 30, 2013

(54) SYSTEM TO DETERMINE FAULT TOLERANCE IN AN INTEGRATED CIRCUIT AND ASSOCIATED METHODS

(75) Inventors: Mark A. Check, Hopewell Junction, NY (US); Andrew R. Ranck, Poughkeepsie, NY (US); Robert Brett Tremaine, Stormville, NY (US)

(73) Assignee: International Business Machines Corporation, Armonk, NY (US)

(*) Notice: Subject to any disclaimer, the term of this patent is extended or adjusted under 35 U.S.C. 154(b) by 598 days.

(21) Appl. No.: 12/405,858

(22) Filed: Mar. 17, 2009

(65) Prior Publication Data

US 2010/0241900 A1    Sep. 23, 2010

(51) Int. Cl.
*G06F 11/00*    (2006.01)
(52) U.S. Cl.
USPC ............................................ 714/15

(58) Field of Classification Search ............ 714/30, 714/15, 724
See application file for complete search history.

(56) References Cited

U.S. PATENT DOCUMENTS

| 6,744,274 B1* | 6/2004 | Arnold et al. ............... 326/16 |
| 2007/0176627 A1 | 8/2007 | Ng et al. ..................... 326/14 |
| 2007/0198892 A1 | 8/2007 | Ng et al. ..................... 714/763 |
| 2009/0287956 A1* | 11/2009 | Flynn et al. |

* cited by examiner

*Primary Examiner* — Scott Baderman
*Assistant Examiner* — Yair Leibovich
(74) *Attorney, Agent, or Firm* — Steven Chiu

(57) ABSTRACT

A system to determine fault tolerance in an integrated circuit may include a programmable logic device carried by the integrated circuit. The system may also include a configurable memory carried by the programmable logic device to control the function and/or connection of a portion of the programmable logic device. The system may further include user logic carried by said programmable logic device and in communication with a user and/or the configurable memory. The user logic may identify corrupted data in the configurable memory based upon changing user requirements.

28 Claims, 13 Drawing Sheets

SYSTEM TO DETERMINE FAULT TOLERANCE IN AN INTEGRATED CIRCUIT AND ASSOCIATED METHODS

FIELD OF THE INVENTION

The invention relates to the field of integrated circuits, and, more particularly, to fault tolerance in integrated circuits.

BACKGROUND OF THE INVENTION

Field programmable gate array ("FPGA") devices are integrated circuit chips having an array of configurable logic blocks embedded in a matrix of interconnecting conductors with configurable connections to each other and to the logic blocks. A single grouping of programmable elements, of which there may be many in a single FPGA chip, is illustrated in FIG. 1. The grouping's size will be determined by the physical characteristics of the architecture of the FPGA.

The central structures are the data access register arrangement 100 and the addressing function 120 that determine which of the programmable elements 140-157 are being acted upon. Each of these structures in FIG. 1 will be fed by a central load mechanism 103 that is designed to load one or more such structures and will feed to a central cyclic redundancy check ("CRC") checking structure 104 that can check many of these structures. The data access register arrangement 100 is fed from the central load mechanism by a scan connection 101 and feeds to the central CRC checking structure 104 by a scan connection 102.

Each programmable element 140-157 consists of two parts, the static random access memory ("SRAM") 160 and the programmable logic 161. The size of the SRAM 160 in each cell is determined by the extent of the programmability of the programmable logic 161. The size of the SRAM 160 and the desired speed to conduct the checking will determine the extent of the checking performed.

The addressing function 120 will determine which programmable element or elements 140-157 will be loaded or read to the data access register arrangement 100 in any given cycle. The data access register arrangement 100 is connected to the programmable elements 140-157 by data buses 110-115 which are each as wide as the SRAM 160 in a single programmable element 140-157.

The control from the address function 120 to each programmable element is connected by address selection signals 130-135. It is possible to load multiple programmable elements in a single column in this example such as 140, 146, and 152.

SUMMARY OF THE INVENTION

One aspect of the invention is a system to determine fault tolerance in an integrated circuit that may include a programmable logic device carried by the integrated circuit. The system may also include a configurable memory carried by the programmable logic device to control the function and/or connection a portion of the programmable logic device. The system may further include user logic carried by said programmable logic device and in communication with a user and/or the configurable memory. The user logic may identify corrupted data in the configurable memory based upon changing user requirements.

The user logic may provide access to a configurable memory bit and/or a configurable memory checker bit to provide error detection and/or error correction for the configurable memory. A portion of the programmable logic device may be selected as a checker via the user logic and/or based upon the user selecting a corrupted data identification scheme.

The system may also include a capture latch of a row and/or a column of a portion of the programmable logic device. The capture latch and the user logic may cooperate to specifically locate any corrupted data in the configurable memory.

The user logic may determine corrupted data severity, corrupted data significance, and/or corrupted data granularity. The system may further include a multiplexer in communication with the user logic to provide correct data in place of any corrupted data identified in the configurable memory.

The programmable logic device may comprise a complex programmable logic device and/or a field-programmable gate array. The configurable memory may comprise volatile memory, such as static random access memory and/or dynamic random access memory, and/or non-volatile memory, such as FLASH and magnetic random access memory.

Another aspect of the invention is a method to determine fault tolerance in an integrated circuit. The method may include controlling at least one of function and connection of a portion of a programmable logic device via a configurable memory. The method may further include identifying corrupted data in the configurable memory based upon selected user requirements via user logic in communication with a user and/or the programmable logic device.

The method may additionally include accessing a configurable memory bit and/or a configurable memory checker bit to provide error detection and/or error correction for the configurable memory. The method may also include selecting a portion of the programmable logic device as a checker and/or selecting a corrupted data identification scheme.

The method may further include locating any corrupted data in the configurable memory via a capture latch of at least one of a row and a column of a portion of the programmable logic device. The method may additionally include determining at least one of corrupted data severity, corrupted data significance, and/or corrupted data granularity. The method may also include replacing corrupted data in the configurable memory with correct data.

DETAILED DESCRIPTION OF THE PREFERRED EMBODIMENTS

Figure 1:
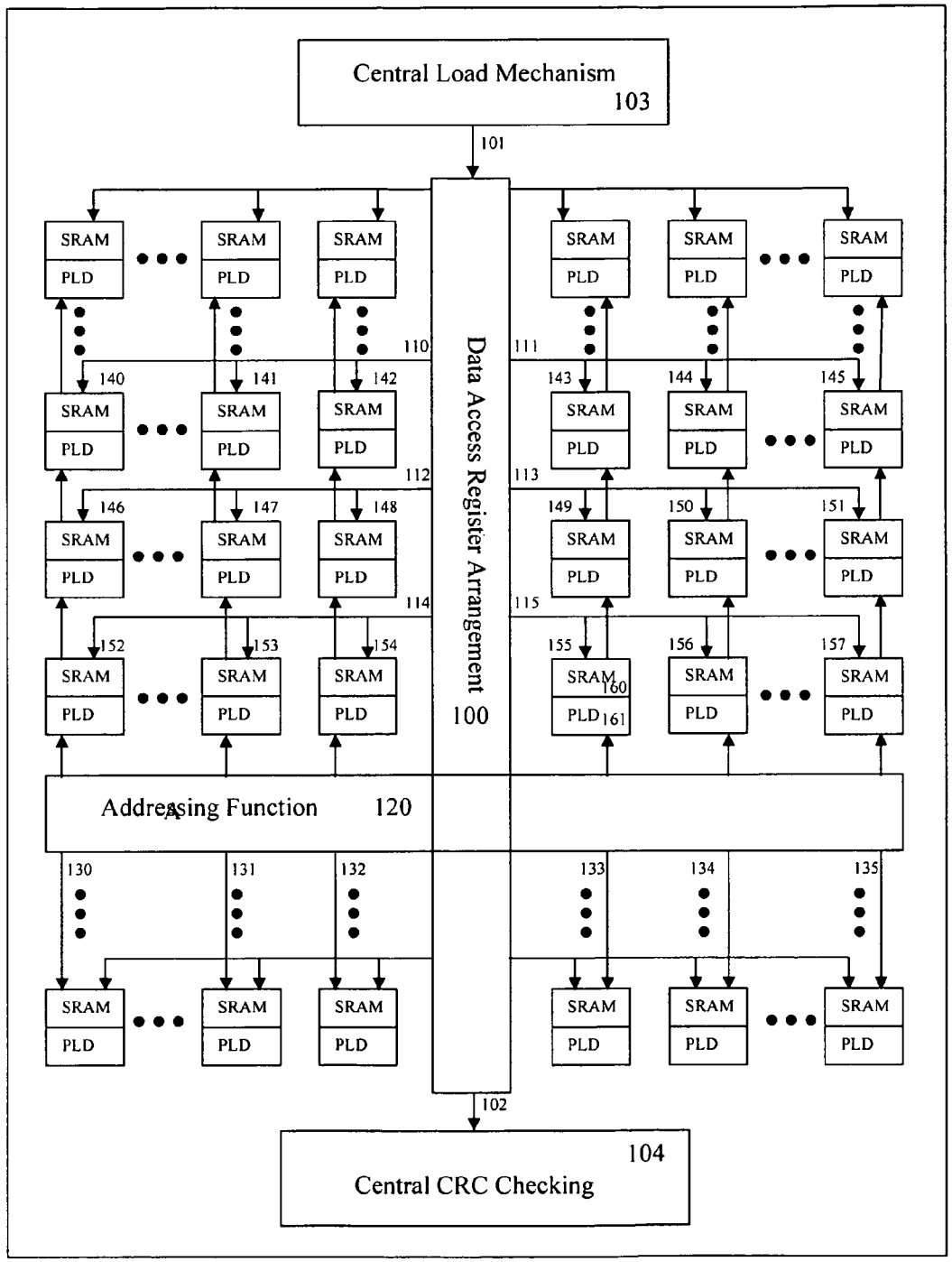
FIG. 1 is a schematic block diagram of a prior art FPGA.

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the invention may be embodied as a method, system, or computer program product. Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
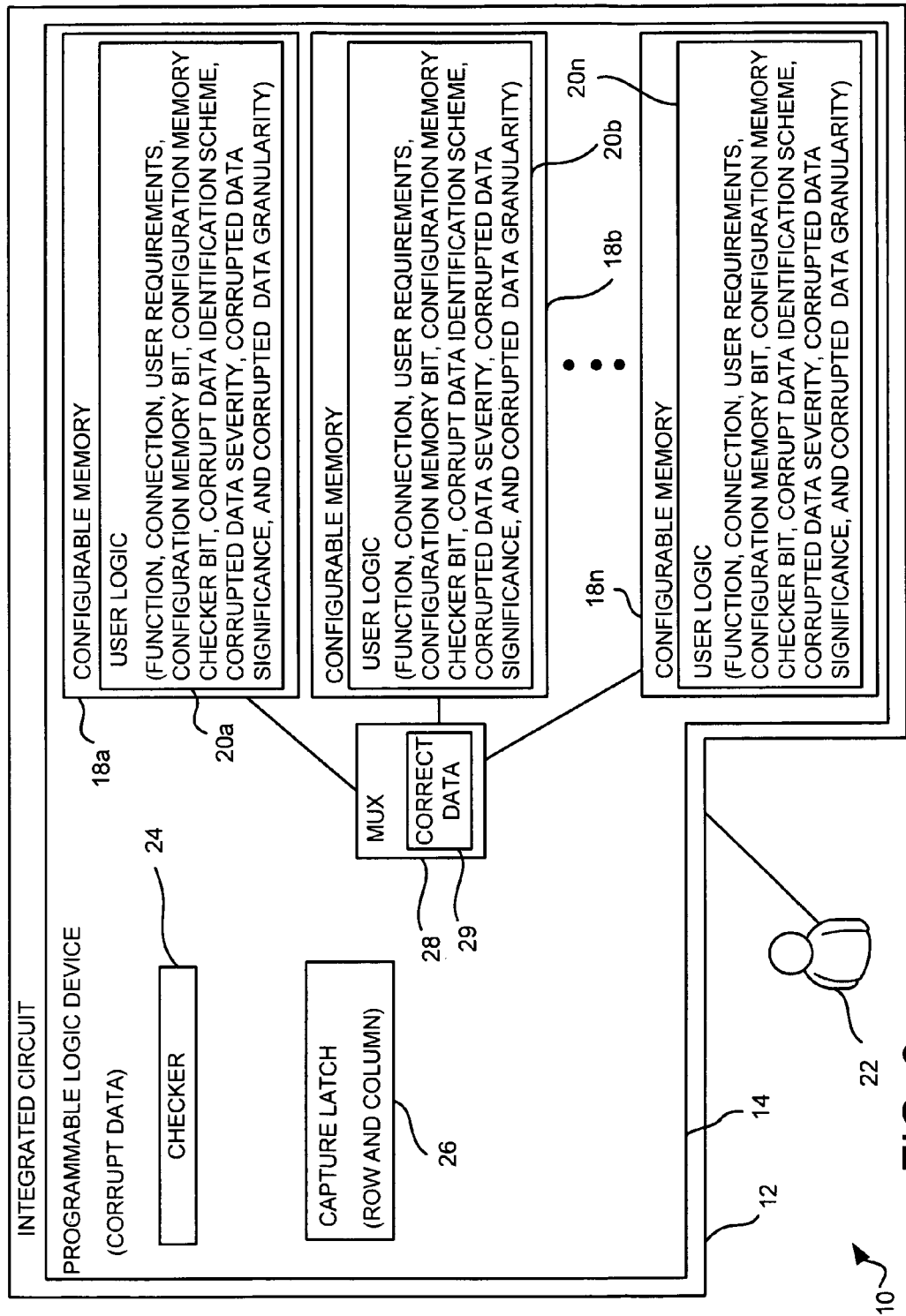
FIG. 2 is a schematic block diagram of a system to determine fault tolerance in accordance with the invention.

Referring to FIG. 2, a system 10 to determine fault tolerance in an integrated circuit 12 is initially described. The system 10 includes a programmable logic device 14 carried by the integrated circuit 12, for example. In one embodiment, the programmable logic device 14 comprises a complex programmable logic device, a field-programmable gate array, or the like as will be appreciated by those of skill in the art.

In another embodiment, the system 10 also includes a configurable logic block array carried by the programmable logic device 14, for instance. In one embodiment, the configurable logic block array comprises a matrix of interconnecting conductors with configurable connections to each other and to the logic blocks.

The system 10 also includes a configurable memory 18a-18n carried by the programmable logic device 14 to control the function and/or connection of the programmable logic device, for example. In one embodiment, a portion of the programmable logic device 14 includes one or more programmable look-up-tables ("LUT") that partially comprise the configurable memory 18a-18n. In another embodiment, the configurable memory 18a-18n comprises SRAM, dynamic random access memory, or the like.

The system 10 further includes user logic 20a-20n carried by said programmable logic device 14 and in communication with a user 22 and/or the configurable memory 18a-18n, for instance. In one embodiment, the user logic 20a-20n identifies corrupted data in the configurable memory 18a-18n based upon changing user requirements. In another embodiment, the configurable memory 18a-18n is used to define the Boolean logical control state or "truth table" for a part of the user logic 20a-20n.

The user logic 20a-20n provides access to a configurable memory bit and/or a configurable memory checker bit to provide error detection and/or error correction for the configurable memory 18a-18n, for example. In one embodiment, a portion of the programmable logic device 14 is selected as a checker 24 via the user logic 20a-20n and/or based upon the user selecting a corrupted data identification scheme. In another embodiment, the user logic 20a-20n determines corrupted data severity, corrupted data significance, and/or corrupted data granularity.

The system 10 also includes a capture latch 26 of a row and/or a column of a portion of the programmable logic device 14, for instance. In one embodiment, the capture latch 26 and the user logic 20a-20n cooperate to specifically locate any corrupted data in the configurable memory 18a-18n.

The system 10 further includes a multiplexer 28 in communication with the user logic 20a-20n to provide correct data 29 in place of any corrupted data identified in the configurable memory 18a-18n, for example.

Figure 3:
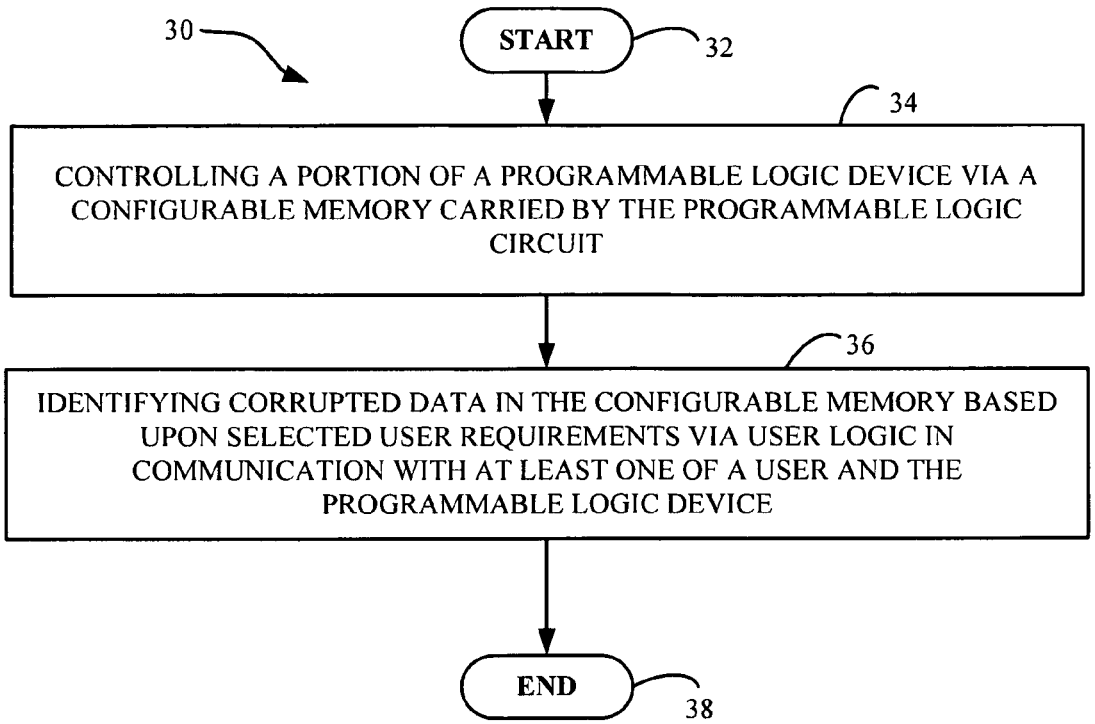
FIG. 3 is a flowchart illustrating method aspects according to the invention.

Another aspect of the invention is a method to determine fault tolerance in an integrated circuit, which is now described with reference to flowchart 30 of FIG. 3. The method begins at Block 32 and may include controlling at least one of function and connection of a portion of a programmable logic device via a configurable memory carried by a programmable logic device at Block 34. The method may also include identifying corrupted data in the configurable memory based upon selected user requirements via user logic in communication with at least one of a user and the programmable logic device at Block 36. The method ends at Block 38.

Figure 4:
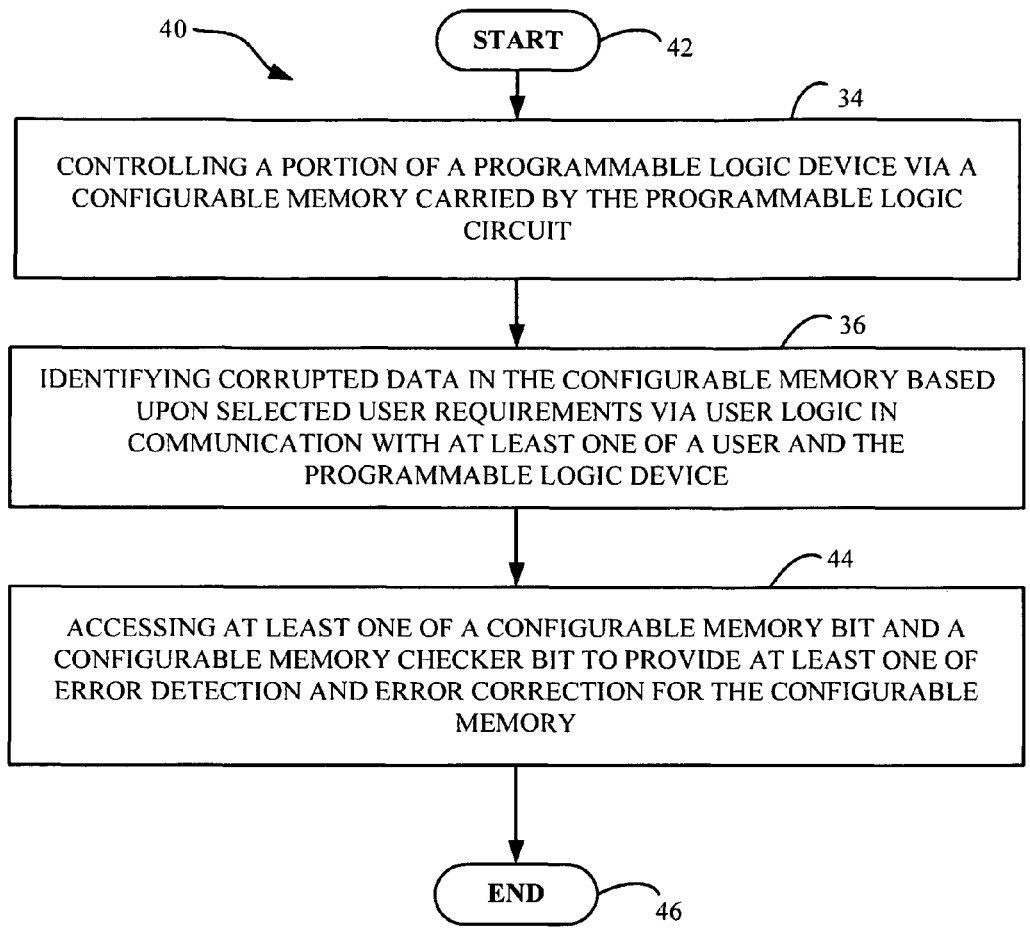
FIG. 4 is a flowchart illustrating method aspects according to the method of FIG. 3.

In another method embodiment, which is now described with reference to flowchart 40 of FIG. 4, the method begins at Block 42. The method may include the steps of FIG. 3 at Blocks 34 and 36. The method may also include accessing at least one of a configurable memory bit and a configurable memory checker bit to provide at least one of error detection and error correction for the configurable memory at Block 44. The method ends at Block 46.

Figure 5:
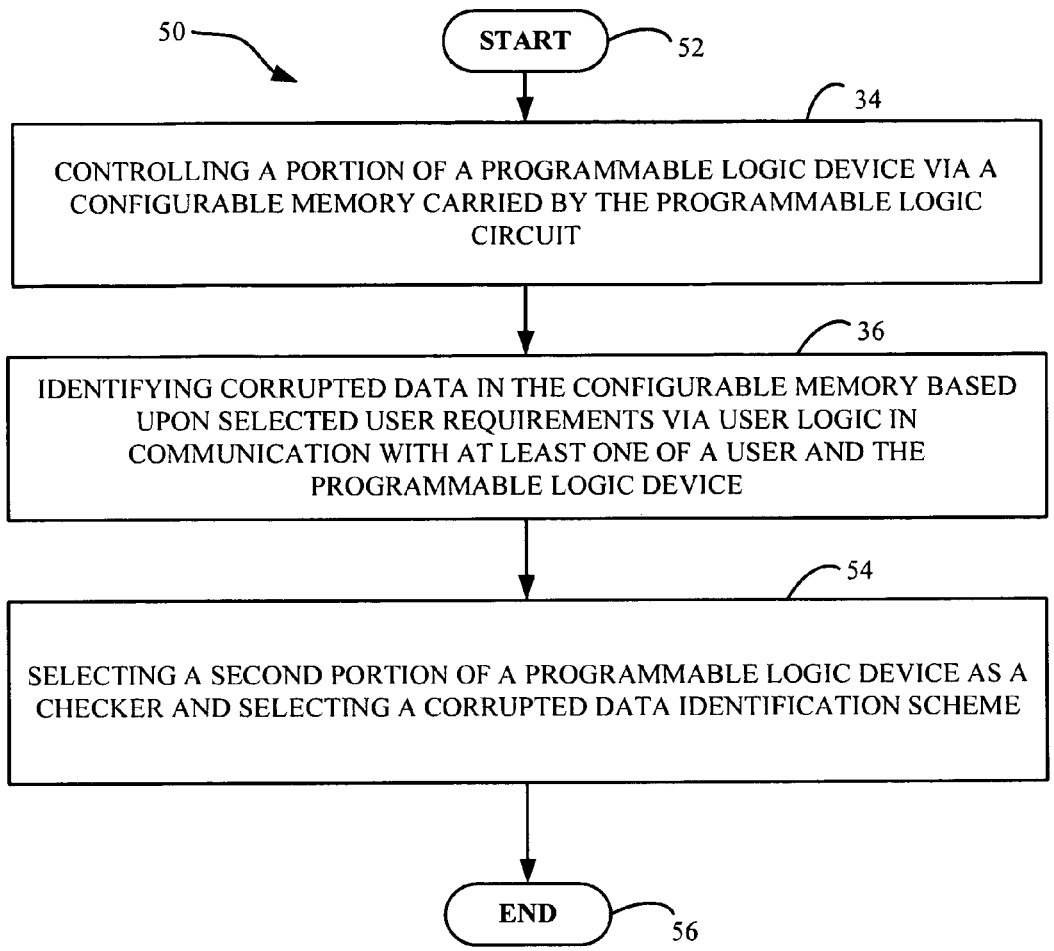
FIG. 5 is a flowchart illustrating method aspects according to the method of FIG. 3.

In another method embodiment, which is now described with reference to flowchart 50 of FIG. 5, the method begins at Block 52. The method may include the steps of FIG. 3 at Blocks 34 and 36. The method may also include selecting a portion of the programmable logic device as a checker via the user logic and based upon the user selecting a corrupted data identification scheme at Block 54. The method ends at Block 56.

Figure 6:
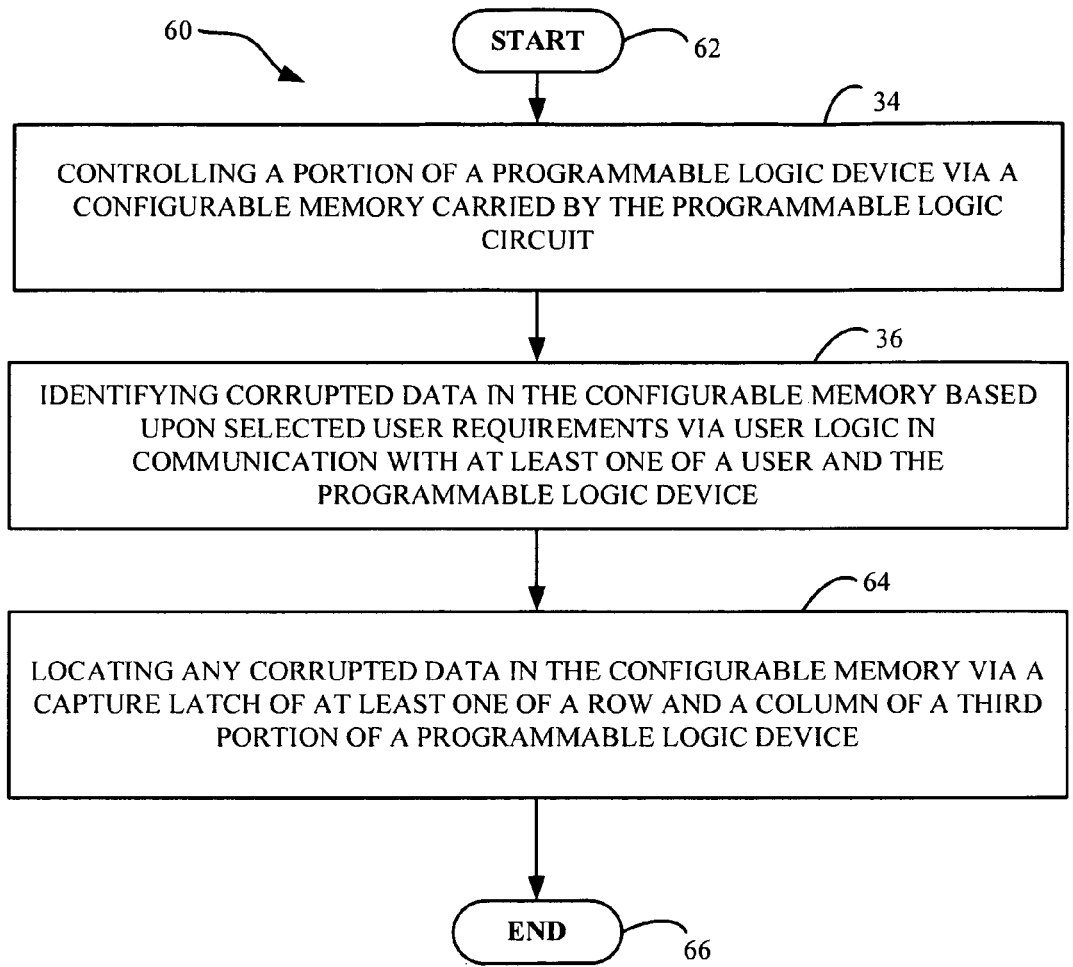
FIG. 6 is a flowchart illustrating method aspects according to the method of FIG. 3.

In another method embodiment, which is now described with reference to flowchart 60 of FIG. 6, the method begins at Block 62. The method may include the steps of FIG. 3 at Blocks 34 and 36. The method may also include locating any corrupted data in the configurable memory via a capture latch of at least one of a row and a column of a portion of the programmable logic device at Block 64. The method ends at Block 66.

Figure 7:
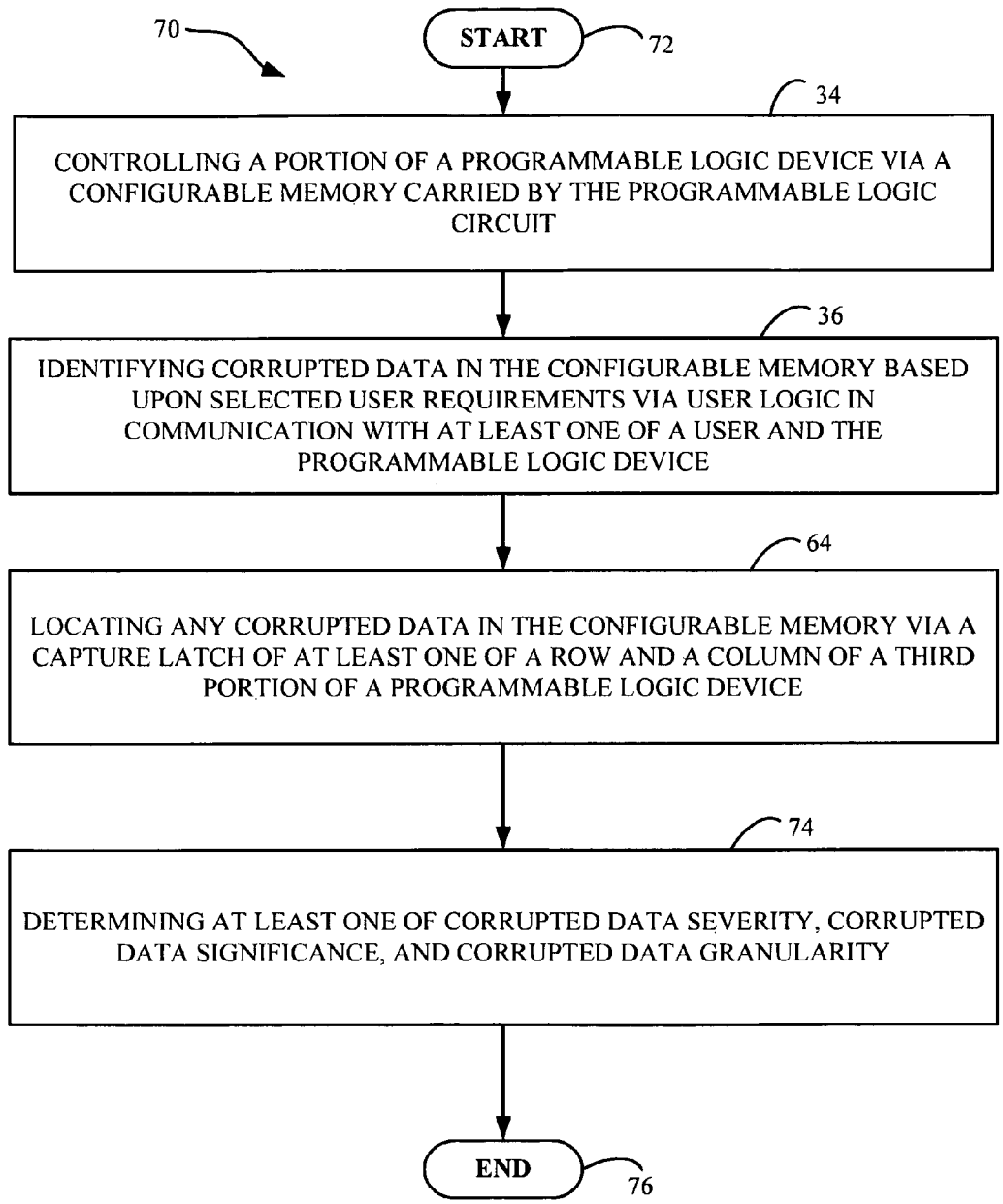
FIG. 7 is a flowchart illustrating method aspects according to the method of FIG. 6.

In another method embodiment, which is now described with reference to flowchart 70 of FIG. 7, the method begins at Block 72. The method may include the steps of FIG. 6 at Blocks 34, 36, and 64. The method may also include determining at least one of corrupted data severity, corrupted data significance, and corrupted data granularity at Block 74. The method ends at Block 76.

Figure 8:
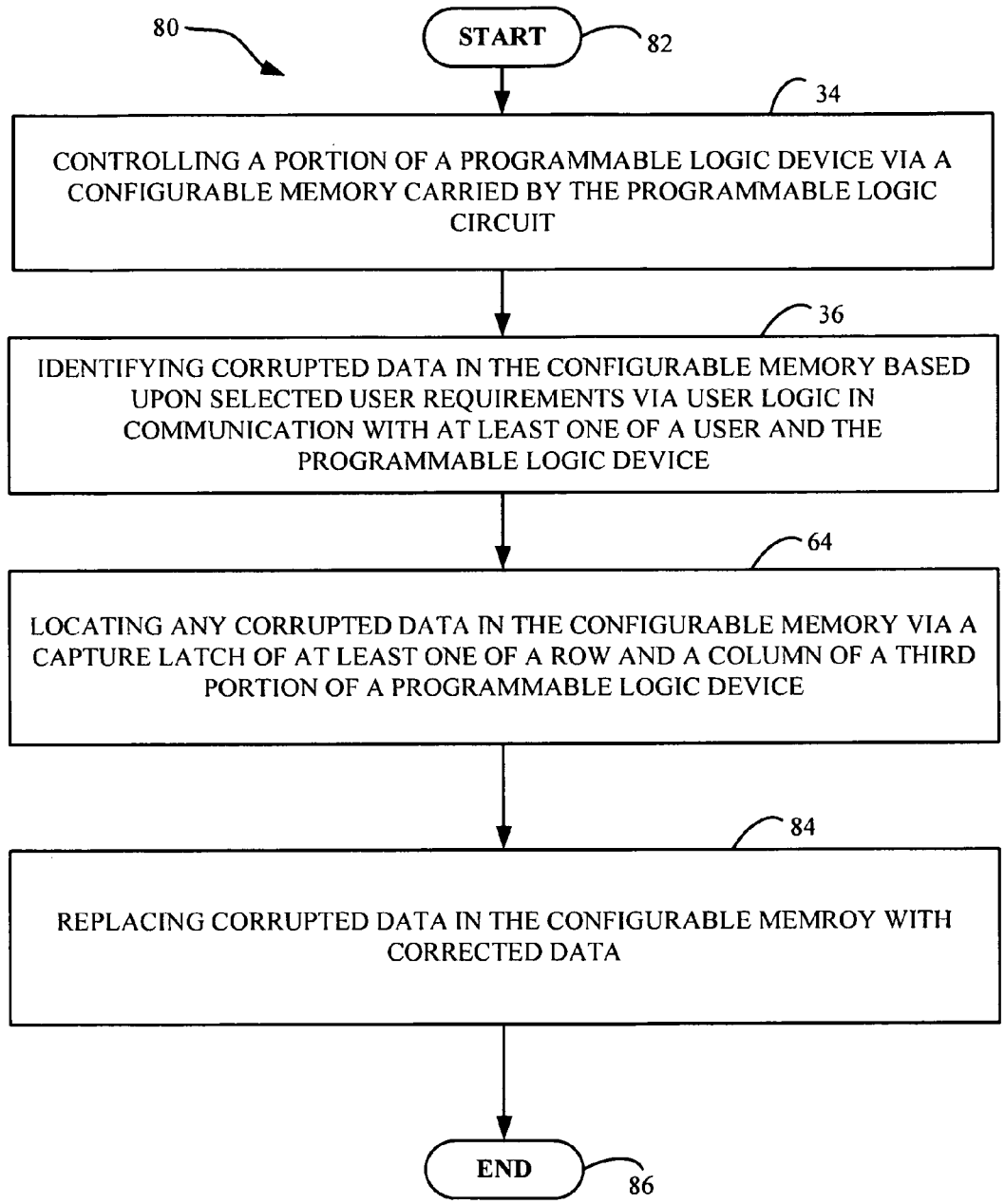
FIG. 8 is a flowchart illustrating method aspects according to the method of FIG. 6.

In another method embodiment, which is now described with reference to flowchart 80 of FIG. 8, the method begins at Block 82. The method may include the steps of FIG. 6 at Blocks 34, 36, and 64. The method may also include replacing corrupted data in the configurable memory with corrected data at Block 84. The method ends at Block 86.

In view of the foregoing, the system 10 determines fault tolerance in an integrated circuit. In addition, system 10 describes an apparatus and method for having the user logic 20a-20n access the FPGA configuration memory state for low cost and low-latency configuration memory logic fault detection and correction.

The user logic 20a-20n is enabled configurable access to the array of configurable memory 18a-18n via configurable connections between the associated data and address access registers and the matrix of interconnecting conductors. Configurable multiplexer(s) 28 at the data access registers provide the means to define the minimum granularity access to the configurable memory 18a-18n column data.

User attributes to compile software define specific error detection and correction algorithms (parity, error correcting code, cyclic redundancy code ("CRC"), checksum, etc.), along with the user functions that are targeted for configurable memory 18a-18n testing, so that those functions can be efficiently mapped and underlying configurable memory 18a-18n address ranges, check bits, and mask bits pertaining to unused configuration state are embedded into the user application test function for employing desired checking and correction. The user test function runs periodically to test and correct any fault for the targeted column segments.

As noted above, FPGA devices are integrated circuit chips having an array of configurable logic blocks embedded in a matrix of interconnecting conductors with configurable connections to each other and to the logic blocks. In view of such, special input/output and phase-lock loop clock blocks are integrated around and in the array with configurable functions and connections.

The array of configurable logic blocks is each further comprised of one or more programmable look-up-table ("LUT") configuration memories. These memories are used to define the Boolean logical control state or "truth table" for a part of the user application logic function. However, this control state is not directly accessible by the user function itself.

Generally, the memories are implemented with dense SRAM and have to be initialized from state stored outside the chip, where data is clocked into chip registers on special pins according to a specific protocol. After sufficient configuration data has been accumulated, the registered data is loaded into a column of configuration memory.

The configuration memories are susceptible to logic upset from environmental radiation, and when such an event occurs, it may change the behavior of the user application logic without indication. Moreover, the faulty behavior may result in the user logic function to mimic an incorrect but acceptable behavior, such that the fault goes unnoticed in the overall system, leading to what is known as a silent data corruption ("SDC").

FPGA devices incorporate on chip self checking mechanisms to periodically sample the configuration memory state across large segments or the entire array and calculate against an expected CRC. An error indication signal is provided to the user application logic in the event an error is detected. Since this process is sequential and the FPGA arrays are large, the latency for an error indication may be several milliseconds, long enough for one or more SDC event to occur in the system. A variation of this self checking scheme has mask registers associated with the configuration memory to facilitate writing a specific portion of the configuration memory to correct a detected error.

The accepted practices for managing the SDC problem in real-time are borne exclusively by the user application, and without assistance or recognition of the underlying configuration memory state. For example, replicating (duplex or triplex) and comparing user application functions that are conducive to SDC in the presence of a configuration memory fault. For example, encryption/decryption, compression, arithmetic, memory management, and fault detection units all have this characteristic.

The cost of these schemes can be quite high in FPGA device utilization, power consumption, and degradation to overall timing due to utilization. Further, these detections cannot be corrected without re-initializing the chip, a process that requires many milliseconds and is generally too disruptive to the overall system.

Other prior art describe special error detection and correction circuits implemented on chip together with the logic blocks. These pervasive reliability schemes require significant area and power cost to the user application function even when not required or used (generally 30-50% of the configuration memory in an FPGA is not used).

As FPGA devices increase in scale through the use of increasingly dense technology (40 nm and beyond), the configuration memory also increases in scale, and with that scale comes longer checking and initialization latencies, as well as increases in logic upset rates. Further, the denser devices are now enabling broader application to system applications that are less tolerant of the configuration memory fault characteristics.

System 10 provides the user logic 20a-20n access to the underlying configurable memory 18a-18n to facilitate the user to implement and manage the configuration memory error detection and correction as desired as part of the user application function for the lowest latency and lowest cost in area and power.

The various embodiments of the system 10 provide a means by which fine grain local checking and correction of the SRAM that configures the individual programmable blocks such as a LUT or the like. Depending upon the desired time in which to complete the checking of the targeted SRAM will determine what the final structure and cost of additional structures required to implement the checking.

In its least costly embodiment, all that is added is a series of tap points and multiplexed insertion points to the existing mechanism to load the SRAM that does the configuration at only the natural boundaries for such a single programmable entity. In a more aggressive embodiment, several tap points and multiplexed insertion points may be required for such a single programmable entity.

If multiple parallel entities wish to be checked, even additional register scan chains may be required to be inserted. The process of checking and correction of the SRAM that configures the programmable entity may have multiple embodiments. The two main embodiments that will be highlighted will be a cyclic redundancy check or CRC checking for validity with a stored compressed pattern for replacement of the corrupted pattern and an error correcting code or ECC checking for validity with ECC correction for replacement of the corrupted pattern.

The above describes some preferred embodiments; however the claimed invention is not limited to such preferred embodiments. The architecture of the underling FPGA structure, the size of the configuration SRAM in each programmable entity, the desired time to complete checking of validity of the SRAM will drive the particular embodiment desired for each application. For a better understanding of how the embodiments will be realized please refer to the brief description of the drawings and the detailed description of the invention.

For example, system 10 relates to local detection and correction of the SRAM that controls the programming of each individual programmable element in an FPGA. It does not imply that in the final implementation there is a particular amount of the blocks that will be covered by any one particular method of checking and replacement. In the present description numerous specific details are presented to provide a more detailed understanding of some of the elements, structure, methods, and capabilities of the invention. However, it is assumed that someone skilled in the art could understand other means and methods to accomplish the same effects presented in this application.

Figure 9:
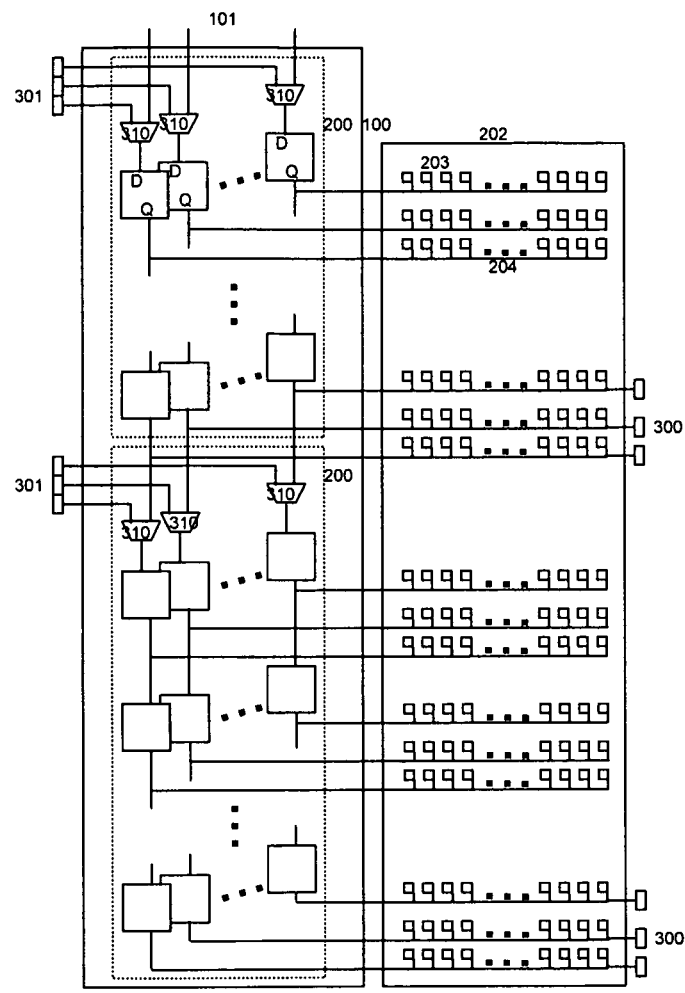
FIG. 9 is a schematic block diagram of a configurable memory and associated data access registers having new elements for user logic in accordance with the invention.

A prophetic example system 10 is now described with additional reference to FIG. 9. FIG. 9 illustrates an FPGA "frame" data access register arrangement 100 for reading and writing a configurable memory 202 column cells 203 via row data busses 204, including new elements 301, 310 and 300 for user logic access to the same features.

The data access register arrangement 100 can be partitioned into one or more sub-chain of latch registers 200 having user configurable access to the user interconnect matrix and user logic application. The user logic can read one or more columns of the configuration memory into the data access registers, then clock the sub-chain serial data through the connections 300 and interconnect resources to the user logic to compute an error detection code, and verify said code matches that pre-computed for the same data during FPGA user code compile time.

The user code can correct detected faults in the configuration data and shift the corrected data back into the data access registers through the interconnect resource connections 301 and multiplexers 310. The corrected data can then be written into the selected columns 203 via data busses 204.

Figure 10:
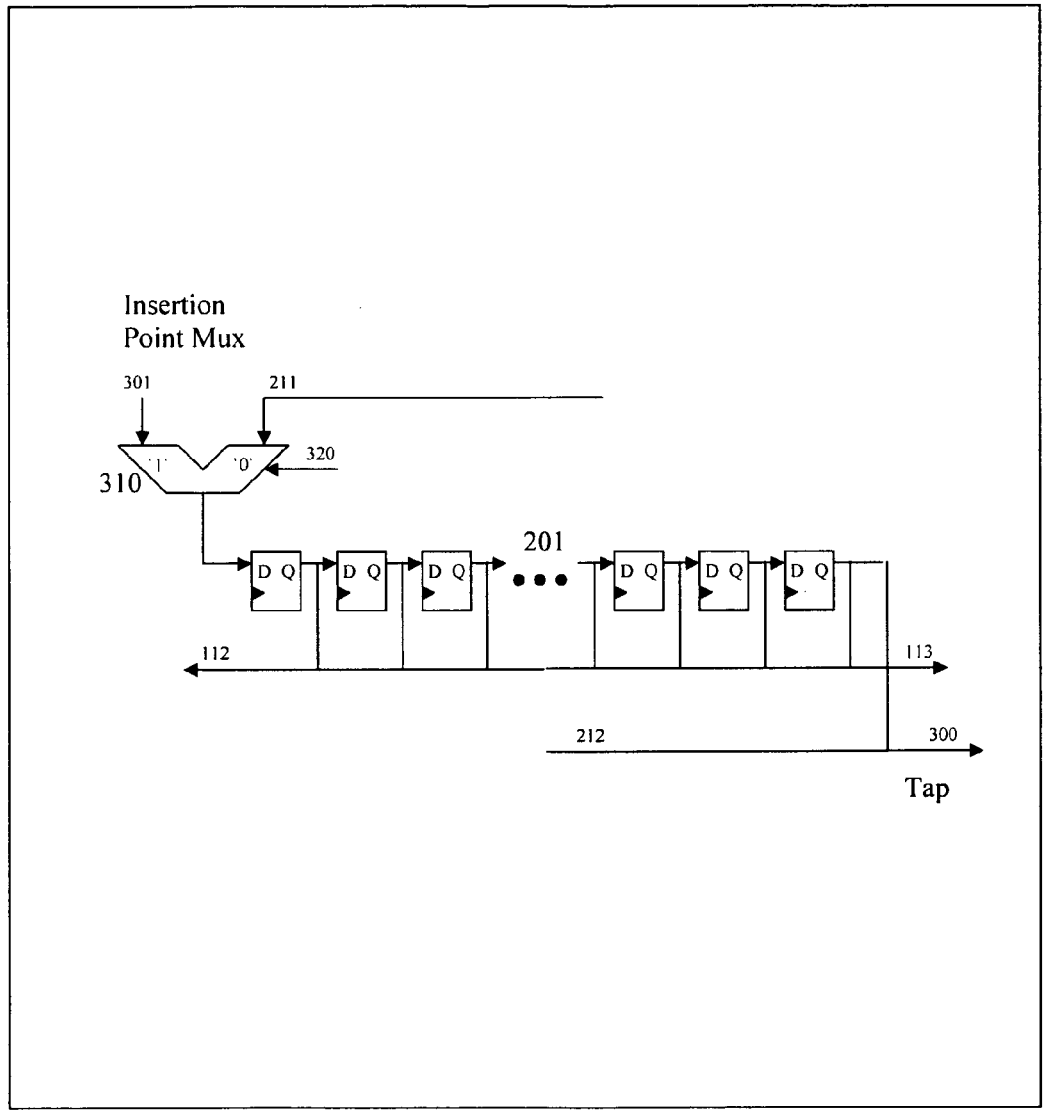
FIG. 10 is a schematic block diagram illustrating new taps to conduct local checking and multiplexed insertion points for local pattern correction of the SRAM that controls a programmable element of the FPGA in accordance with the invention.

FIG. 10 illustrates a single sub-chain 201 in the data access register arrangement 100 with new elements of this invention to provide a means to tap 300 the ring for local checking and a means to inject a new corrected stream 301 into the multiplexer insertion point 310. The multiplexer insertion point 310 is controlled by a local multiplexer control line 320. During the local checking function only the tap function 300 is being used to provide the ability to perform local checking of the data. After the detection of an error has occurred the multiplexer insertion point 310 is used to provide corrected data 301 to the selected programmable element 140-157.

Figure 11:
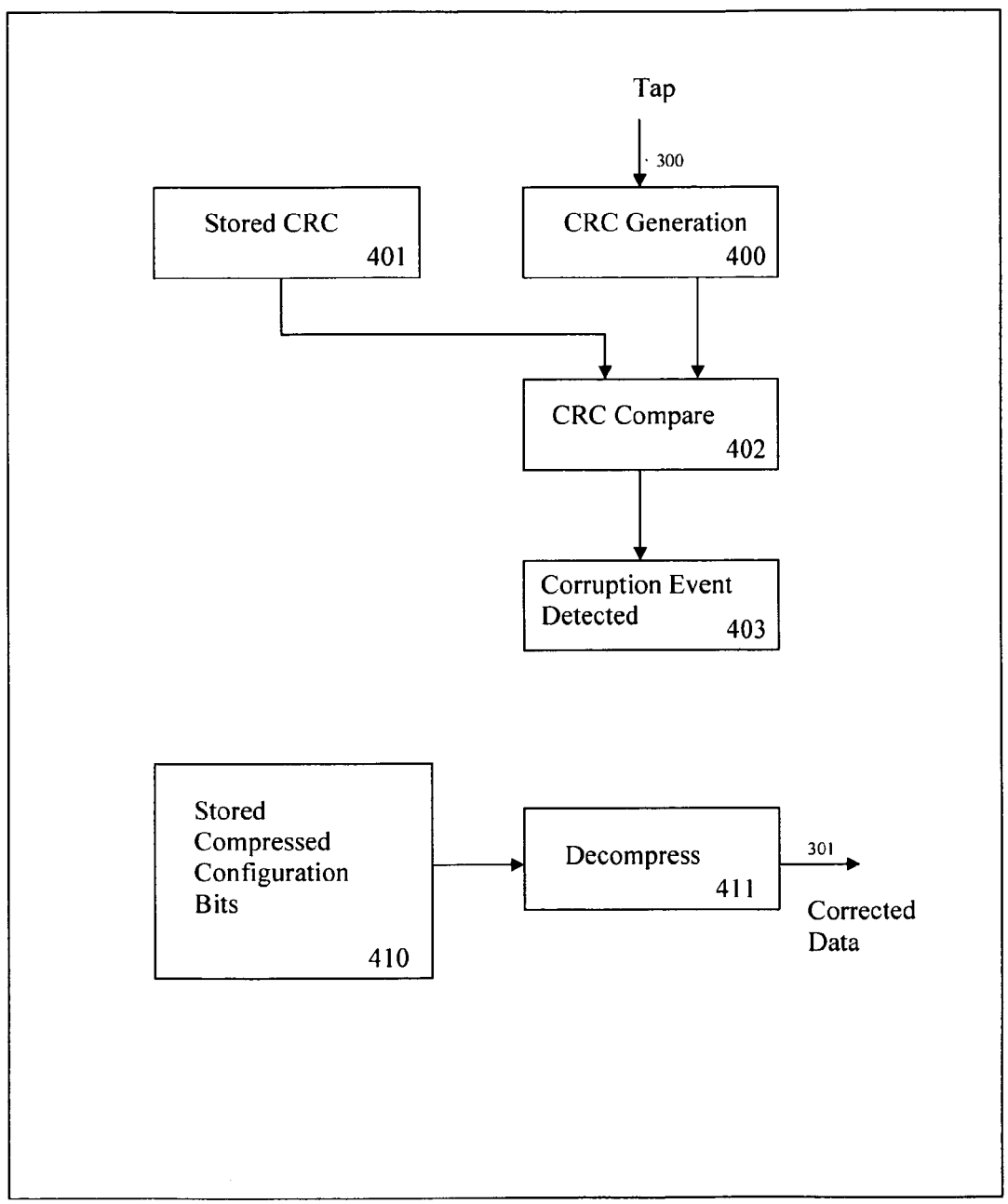
FIG. 11 is a schematic block diagram illustrating local checking added to perform checking based on a CRC and local correction based on a stored compressed pattern to provide replacement in accordance with the invention.

FIG. 11 illustrates the local checking and correction of the configuration SRAM 160 of a particular programmable block 140-157 using a CRC function for checking and a stored value for the replacement SRAM bits 160. The sub-chain data tap 300 provides the local checking logic with the bits from the sub-chain 201 or sub-chains 200-202 which are fed into the CRC generation logic 400.

The final result of the sub-chain or sub-chains are compared to a known good stored value of the CRC 401 in the CRC compare logic 402. The result from the CRC compare logic is remembered in a local corruption event detected register 403 and is later used to alter the value of the local multiplexer control line 320 when it is time to execute the re-load of the corrupted local SRAM 160.

Figure 12:
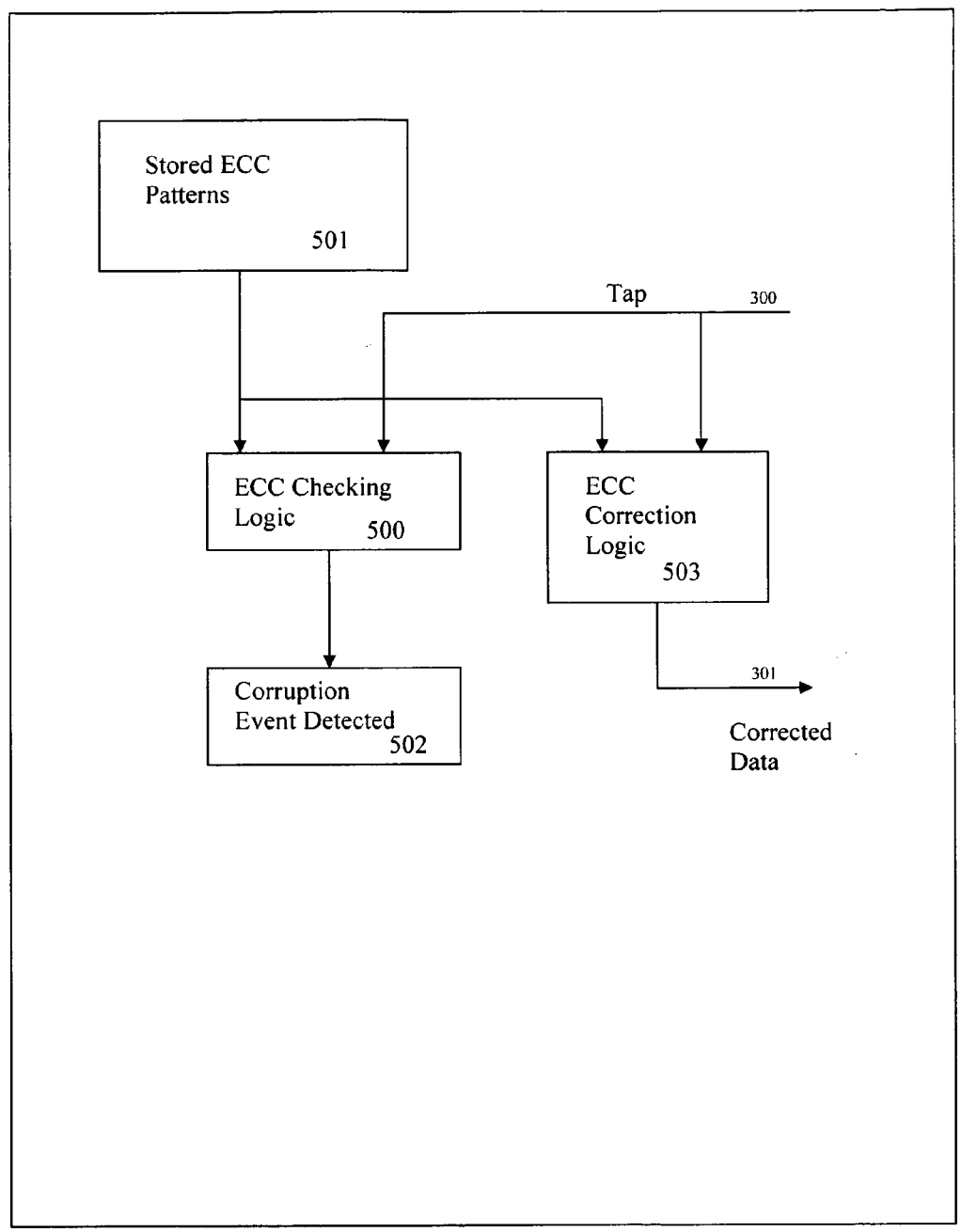
FIG. 12 is a schematic block diagram illustrating local checking added to perform checking based on stored ECC patterns and local correction based on those same stored ECC patterns to provide replacement in accordance with the invention.

FIG. 12 illustrates the local checking and correction of the configuration SRAM 160 of a particular programmable block 140-157 using an ECC function for checking and correction for the replacement SRAM bits 160. The sub-chain tap 300 provides the local checking logic with the bits from the sub-chain 201 or sub-chains 200-202 which are fed into the ECC checking function 500.

The correct ECC checking patterns are supplied form the ECC pattern storage 501. The result of the ECC detection is remembered in a local corruption event detected register 502 and is later used to alter the value of the local multiplexer control line 320 when it is time to execute the re-load of the corrupted local SRAM 160. The ECC correction logic 503 takes in the data from the sub-chain 201 via the tap 300 with the supplied ECC correction pattern 501 to create the corrected bit data 301 to be supplied to the multiplexer insertion point 310.

Figure 13:
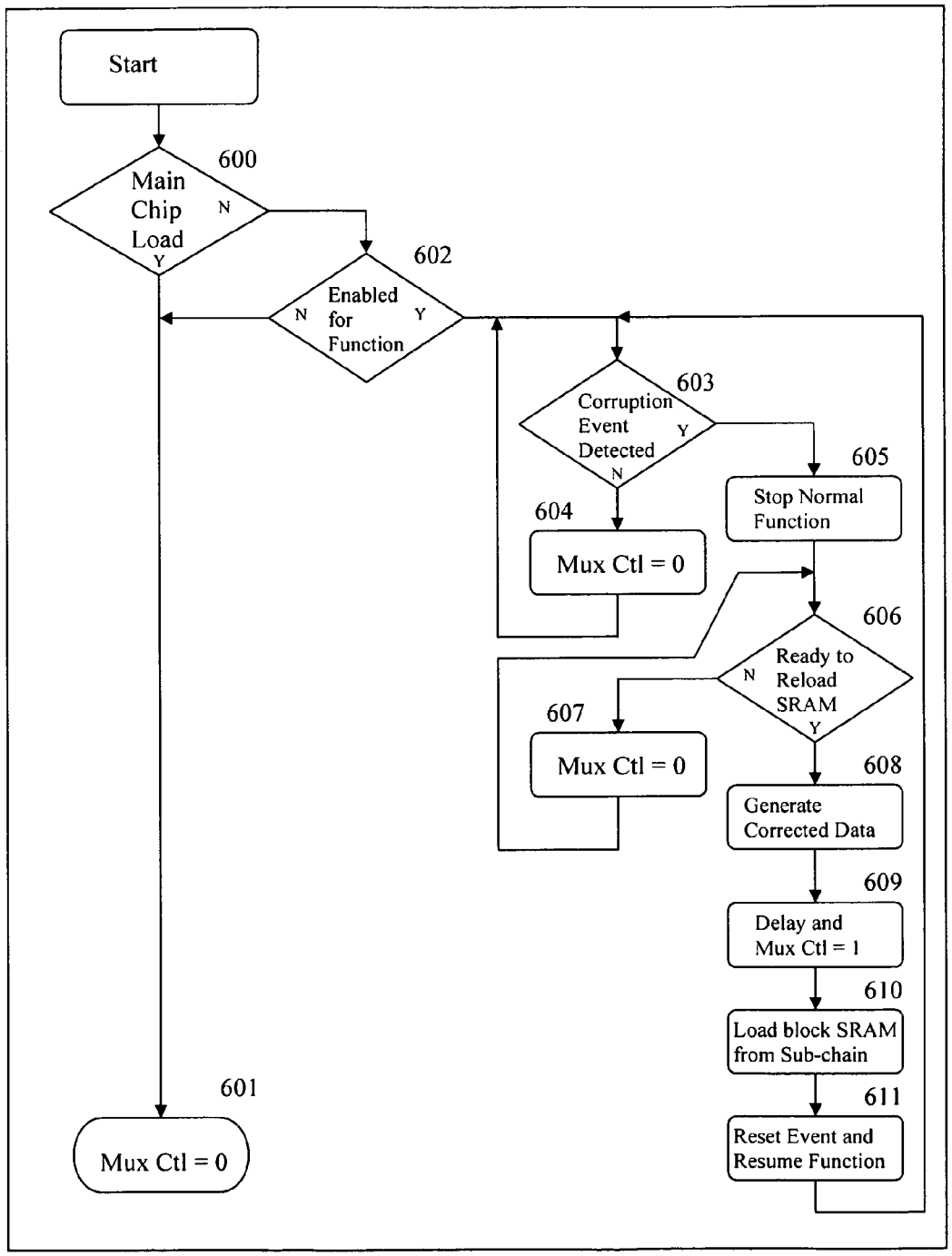
FIG. 13 is a flowchart for operation of the local multiplexer control line in accordance with the invention.

FIG. 13 illustrates the logic flowchart that determines the control of the local multiplexer control line 320 at the multiplexer insertion site 310 is based on FPGA global controls and local results. At the first decision block 600 the global control signal that indicates the FPGA is being loaded is active the local multiplexer insertion site 310 control line 320 to be the value of zero or the default data scan chain path at result block 601.

If that signal in decision block 600 is inactive then proceed to decision block 602. In decision block 602 examine if this programmable block 140-157 is enabled for local correction. If not then proceed to result block 601 with the default multiplexer control line set to a value of zero.

If this programmable block 140-157 is enabled for local correction then proceed to decision block 603. If a local corruption event 403 or 502 has not been detected proceed to result block 604 and then back to decision block 603 again. If there has been a local corruption event detected 403 or 502 then proceed to action block 605.

At action block 605 stops normal functions in the programmable logic block 140-157. Once stopped proceed to decision block 606. At decision block 606 determine if ready to recover and correct the SRAM values in that programmable logic block 140-157.

If not, proceed to action block 607 where the value of zero or the default data scan chain is left. Loop at decision block 606 until ready to perform the recovery function and proceed to action block 608. In action block 608 begin the generation of the correct SRAM values to load into the local programmable block 140-157 by either of the two means described above.

Once that process has started, proceed to action block 609 where the correct amount of delay is introduced before setting the value of one on the corrected data chain value on the multiplexer control line 320 and the correct SRAM bit stream on correct data line 302. Then proceed to action block 610 where the correct SRAM bit stream has been scanned into the sub-chain 201 and afterwards set a value of zero or the default data scan chain on the multiplexer control line 320 and load the targeted programmable block 140-157 SRAM 160 with this data.

Proceed to action block 611 which resumes normal operation for the programmable logic block 140-157 and resets the local corruption event 403 or 502. Then proceed back to decision block 603 to check for more corruption faults of the local SRAM 160.

In one embodiment, a programmable logic device comprises a configuration memory and associated data access registers arranged as a shift register having each stage read and write a plurality of configuration memory array column cells via an associated array row data bus. The programmable logic device also includes a user configurable coupling of at least one row data bus to the configurable interconnection resources. The programmable logic device further includes a user configurable state bit for controlling the row data bus coupling.

In another embodiment, the programmable logic device additionally includes the row data bus having the user configurable coupling is further arranged having associated frame data shift register stage coupled to a multiplexer first input and multiplexer output is coupled to next stage register input. The multiplexer second input is coupled to a user configurable coupling to the configurable interconnection resources, and a user configurable state bit for controlling the row data bus coupling. The user configurable state bit, where the state is derived from a programmable register when a configuration memory cell output state is not practical.

In another embodiment, the programmable logic device further includes the means to have user logic application logic access the configuration memory and associated data access registers that is unused for the purpose of storing a redundant copy of the configuration memory state. In one embodiment, the redundant copy of the configuration memory state has the state logically compressed with a loss-less coding algorithm.

In another embodiment, the programmable logic device further comprises a configurable signal between non-user function and user logic application to share access to the configuration memory and associated data access registers. The programmable logic device may also include the means to share non-user function access to the configuration memory and associated data access registers, and the non-user function asserts a busy signal to indicate when user accessible. The non-user functions may include the means to mutually exclusively provide fault detection of the configuration memory and associated data access registers between a user logic application and non-user functions.

Another embodiment is a user logic application compilation method for configuration memory fault tolerance is where user logic has attributes declaring what specific logic is to be protected and associated with what specific configuration memory fault management logic having specified error detection algorithm, predefined variables for unused configuration bits and error coding check bits, and mapping preferences defining when logic may be controlled or not in the same configuration memory.

The method includes the following steps: synthesize and map specific protected user logic to minimize access pattern to configuration memory and associated data access registers; synthesize and map specific fault management logic according to specified mapping preferences; identify and encode unused configuration memory bits; and identify error coding check bits.

In another embodiment, a method for configuration memory fault tolerance by user application logic is explained by the following steps. Read a column of configuration memory, comprising Non-user function busy with non-user configuration memory, then wait, else. Write configuration memory address register and data multiplexing control state. Assert configuration memory read signals. Shift read data from configuration memory read registers through interconnection matrix to user application fault manager logic. Validate read data, comprises Compute error detection code (EDC) for read data. Compare calculated EDC with hard-coded expected EDC calculated at compile-time. If no fault is detected or fault is detected but is in an unused configuration memory bit, then advance to next address and go to step 1, else. If fault detected is uncorrectable with EDC, then signal uncorrectable error to user application, then go to uncorrectable fault state, else signal correctable error detection. Correct fault, comprises Shift corrected data to configuration memory read registers through interconnection matrix. Assert configuration memory write signals, then go to step 1. Uncorrectable fault state comprises Stop user logic application for data logging and re-initialization of configuration memory from redundant copy.

The capabilities of the system 10 can be implemented in software, firmware, hardware, or some combination thereof.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. Furthermore, the use of the terms a, an, etc. do not denote a limitation of quantity, but rather denote the presence of at least one of the referenced item.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

That which is claimed is:

1. A system to determine fault tolerance in an integrated circuit comprising:
   a programmable logic device carried by the integrated circuit;
   configurable memory carried by the programmable logic device to control at least one of function and connection of a portion of said programmable device;
   user logic carried by said programmable logic device and in communication with at least one of a user and said configurable memory, said user logic to identify corrupted data in said configurable memory based upon changing user requirements, the user logic being part of a user application function programmed by the user; and
   data access registers that correspond to the configurable memory and arranged as a shift register having each stage read and write a plurality of configuration memory array column cells via an associated array row data bus, the array row data bus coupled to a multiplexer first input and a multiplexer output, the multiplexer output coupled to a next stage register input, the multiplexer to provide correct data in place of any corrupted data.

2. The system of claim 1 wherein said user logic provides access to at least one of a configurable memory bit and a configurable memory checker bit to provide at least one of error detection and error correction for said configurable memory.

3. The system of claim 1 wherein a second portion of said programmable device is selected as a checker via said user logic and based upon the user selecting a corrupted data identification scheme.

4. The system of claim 1 further comprising a capture latch of at least one of a row and a column of a third portion of said programmable device, said capture latch and said user logic cooperate to specifically locate any corrupted data in said configurable memory.

5. The system of claim 4 wherein said user logic determines at least one of corrupted data severity, corrupted data significance, and corrupted data granularity.

6. The system of claim 4 further comprising a multiplexer in communication with said user logic to provide correct data in place of any corrupted data identified in said configurable memory.

7. The system of claim 1 wherein said programmable logic device comprises at least one of a complex programmable logic device and a field-programmable gate array; and wherein said configurable memory comprises at least one of volatile memory and non-volatile memory.

8. The system of claim 1 wherein the user logic is configured to control the time in which to complete checking of the configurable memory based upon the changing user requirements.

9. The system of claim 1 wherein the configurable memory includes a plurality of programmable blocks, each programmable block selectively configurable to be one of enabled for corrupted data identification by the user logic and disabled for corrupted data identification by the user logic.

10. A method to determine fault tolerance in an integrated circuit, the method comprising:
    controlling at least one of a portion of a programmable logic device via a configurable memory;
    identifying corrupted data in the configurable memory based upon selected user requirements via user logic in communication with at least one of a user and the programmable logic device; and
    arranging data access registers that correspond to the configurable memory as a shift register having each stage read and write a plurality of configuration memory array column cells via an associated array row data bus, the array row data bus coupled to a multiplexer first input and a multiplexer output, the multiplexer output coupled to a next stage register input, the multiplexer to provide correct data in place of any corrupted data.

11. The method of claim 10 further comprising accessing at least one of a configurable memory bit and a configurable memory checker bit to provide at least one of error detection and error correction for the configurable memory.

12. The method of claim 10 further comprising selecting a second portion of the programmable logic device as a checker and selecting a corrupted data identification scheme.

13. The method of claim 10 further comprising locating any corrupted data in the configurable memory via a capture latch of at least one of a row and a column of a third portion of the programmable logic device.

14. The method of claim 13 further comprising determining at least one of corrupted data severity, corrupted data significance, and corrupted data granularity.

15. The method of claim 13 further comprising replacing corrupted data in the configurable memory with correct data.

16. A computer program product embodied in a non-transitory tangible media comprising:
    computer readable program codes coupled to the tangible media to determine fault tolerance in an integrated circuit, the computer readable program codes configured to cause the program to:
    control at least one of function and connection of a portion of a programmable logic device via a configurable memory;
    identify corrupted data in the configurable memory based upon selected user requirements via user logic in communication with at least one of a user and the programmable logic device; and
    arrange data access registers that correspond to the configurable memory as a shift register having each stage read and write a plurality of configuration memory array column cells via an associated array row data bus, the array row data bus coupled to a multiplexer first input and a multiplexer output, the multiplexer output coupled to a next stage register input, the multiplexer to provide correct data in place of any corrupted data.

17. The computer program product of claim 16 further comprising program code configured to: access at least one of a configurable memory bit and a configurable memory checker bit to provide at least one of error detection and error correction for the configurable memory.

18. The computer program product of claim 16 further comprising program code configured to: select a second portion of the programmable logic device as a checker and selecting a corrupted data identification scheme.

19. The computer program product of claim 16 further comprising program code configured to: locate any corrupted data in the configurable memory via a capture latch of at least one of a row and a column of a third portion of the programmable logic device.

20. The computer program product of claim 19 further comprising program code configured to: determine at least one of corrupted data severity, corrupted data significance, and corrupted data granularity.

21. The computer program product of claim 19 further comprising program code configured to: replace corrupted data in the configurable memory with correct data.

22. A system to determine fault tolerance in an integrated circuit comprising:
   a programmable logic device carried by the integrated circuit;
   configurable memory carried by the programmable logic device to control at least one of function and connection of a portion of said programmable logic device;
   user logic carried by said programmable logic device and in communication with at least one of a user and said configurable memory, said user logic to identify corrupted data in said configurable memory based upon changing user requirements, and said user logic provides access to at least one of a configurable memory bit and a configurable memory checker bit to provide at least one of error detection and error correction for said configurable memory; and
   data access registers that correspond to the configurable memory and arranged as a shift register having each stage read and write a plurality of configuration memory array column cells via an associated array row data bus, the array row data bus coupled to a multiplexer first input and a multiplexer output, the multiplexer output coupled to a next stage register input, the multiplexer to provide correct data in place of any corrupted data; and wherein a second portion of said programmable logic device is selected as a checker via said user logic and based upon the user selecting a corrupted data identification scheme.

23. The system of claim 22 further comprising a capture latch of at least one of a row and a column of a third portion of said programmable logic device, said capture latch and said user logic cooperate to specifically locate any corrupted data in said configurable memory.

24. The system of claim 23 wherein said user logic determines at least one of corrupted data severity, corrupted data significance, and corrupted data granularity.

25. The system of claim 23 further comprising a multiplexer in communication with said user logic to provide correct data in place of corrupted data identified in said configurable memory.

26. A system to determine fault tolerance in an integrated circuit comprising:
   a programmable logic device carried by the integrated circuit;
   configurable memory carried by the programmable logic device to control at least one of function and connection of a portion of said programmable logic device;
   user logic carried by said programmable logic device and in communication with at least one of a user and said configurable memory, said user logic to identify corrupted data in said configurable memory based upon changing user requirements; and
   a capture latch of at least one of a row and a column of a third portion of said programmable logic device, said capture latch and said user logic cooperate to specifically locate any corrupted data in said configurable memory; and
   data access registers that correspond to the configurable memory and arranged as a shift register having each stage read and write a plurality of configuration memory array column cells via an associated array row data bus, the array row data bus coupled to a multiplexer first input and a multiplexer output, the multiplexer output coupled to a next stage register input, the multiplexer to provide correct data in place of any corrupted data; and
   wherein said user logic determines at least one of corrupted data severity, corrupted data significance, and corrupted data granularity.

27. The system of claim 26 further comprising a multiplexer in communication with said user logic to provide correct data in place of corrupted data identified in said configurable memory.

28. A system to determine fault tolerance in an integrated circuit comprising:
   a programmable logic device carried by the integrated circuit;
   configurable memory carried by the programmable logic device to control at least one of function and connection of a portion of said programmable device;
   user logic carried by said programmable logic device and in communication with at least one of a user and said configurable memory, said user logic to identify corrupted data in said configurable memory based upon changing user requirements;
   a multiplexer in communication with said user logic to provide correct data in place of any corrupted data identified in said configurable memory; and
   data access registers that correspond to the configurable memory and arranged as a shift register having each stage read and write a plurality of configuration memory array column cells via an associated array row data bus, the array row data bus coupled to the multiplexer first input and a multiplexer output, the multiplexer output coupled to a next stage register input.

* * * * *